United States Patent
Hopkins et al.

(10) Patent No.: US 12,422,061 B2
(45) Date of Patent: Sep. 23, 2025

(54) UNDERGROUND DUCT BANK

(71) Applicant: Faith Technologies, Inc., Menasha, WI (US)

(72) Inventors: Frank Hopkins, Shawnee, KS (US); Ian Jordan Walker, Archie, MO (US)

(73) Assignee: Faith Technologies, Inc., Menasha, WI (US)

( * ) Notice: Subject to any disclaimer, the term of this patent is extended or adjusted under 35 U.S.C. 154(b) by 0 days.

(21) Appl. No.: 18/417,687

(22) Filed: Jan. 19, 2024

(65) Prior Publication Data

US 2024/0344637 A1  Oct. 17, 2024

Related U.S. Application Data

(60) Provisional application No. 63/440,263, filed on Jan. 20, 2023.

(51) Int. Cl.
*H02G 9/02* (2006.01)
*F16L 3/22* (2006.01)

(52) U.S. Cl.
CPC .............. *F16L 3/222* (2013.01); *H02G 9/02* (2013.01)

(58) Field of Classification Search
CPC .. H02G 9/02; H02G 9/00; H02G 9/06; H02G 9/08; H02G 15/00; H02G 3/22; H02G 3/26; H02G 3/28; H02G 3/283; H02G 3/30; H02G 3/38; H02G 3/383; H02G 3/00; F16L 3/222; F16L 3/223; F16L 3/23; F16L 5/00; F16L 3/00
USPC .... 174/37, 68.1, 68.3, 72 R, 70 C; 248/68.1, 248/49; 285/223, 120.1, 124.1, 230; 52/220.1, 220.3, 220.5; 405/154.1, 157; 138/111, 113
See application file for complete search history.

(56) References Cited

U.S. PATENT DOCUMENTS

| | | | | |
|---|---|---|---|---|
| 3,858,614 | A * | 1/1975 | Moore | H02G 9/065 174/37 |
| 4,601,447 | A * | 7/1986 | McFarland | F16L 3/222 248/68.1 |
| 5,367,127 | A * | 11/1994 | Dormon | H02G 1/00 174/37 |
| 5,605,419 | A * | 2/1997 | Reinert, Sr. | F16L 3/22 138/113 |
| 6,250,591 | B1 * | 6/2001 | Cunningham | F16L 3/2235 248/74.1 |
| 7,014,152 | B2 * | 3/2006 | Grendahl | H02G 3/32 248/68.1 |

(Continued)

*Primary Examiner* — Angel R Estrada
(74) *Attorney, Agent, or Firm* — Randall W. Fieldhack

(57) ABSTRACT

An underground duct bank assembly includes a plurality of templates each including a longitudinal axis and a transverse axis, a central portion including a plurality of conduit apertures each configured to accommodate a conduit, and first and second outboard portions disposed adjacent the central portion and opposite each other along the transverse axis, each outboard portion including a framework aperture configured to accommodate a framework piece; a plurality of conduits each extending into a conduit aperture; and a framework configured to connect adjacent templates, the framework including a plurality of framework pieces and angle braces, wherein two adjacent angle braces meet at a framework aperture and are affixed to the template and each other without welding.

19 Claims, 10 Drawing Sheets

(56) References Cited

U.S. PATENT DOCUMENTS

| | | | | |
|---|---|---|---|---|
| 7,455,266 B2* | 11/2008 | Faircloth | ................. | H02G 3/36 |
| | | | | 248/57 |
| 8,558,112 B2* | 10/2013 | Pawluk | ................ | H02G 3/0437 |
| | | | | 174/68.3 |
| 8,689,502 B2* | 4/2014 | Langguth | ................. | H02G 3/00 |
| | | | | 52/220.5 |
| 9,972,982 B2* | 5/2018 | Jin | ............................ | F16L 3/18 |
| 10,876,661 B2* | 12/2020 | Pearson | ............... | H02G 3/0406 |
| 11,621,549 B2* | 4/2023 | Movafagh | .............. | H02G 9/065 |
| | | | | 405/180 |

\* cited by examiner

UNDERGROUND DUCT BANK

The present application claims priority to the earlier-filed U.S. Provisional Patent Application having Ser. No. 63/440,263, and hereby incorporates the subject matter of the provisional application in its entirety.

BACKGROUND

Modern construction often requires runs of power, data, control, and sensor conductors and cabling that are extensive in terms of both distance and the number of conductors or cables to be run. Runs of conductors and cabling can be required to reside within solid conduit that is run both above ground and underground.

Underground runs of multiple conduits are typically assembled in a trench, after which the trench is filled with concrete or backfill. Assembling duct banks in such a manner combines the inherent risks of working in trenches with the potential dangers of assembly work in what can be a non-ideal environment.

SUMMARY

The present disclosure solves these issues by providing an easy-to-install duct bank assembly that can be manufactured under the controlled conditions of a factory and installed with minimal field work. A template design allows the duct bank assembly to be shipped and installed with the sides of the duct bank assembly already enclosed, thus eliminating the need to install rebar, side panels, and hundreds of tie wire attachments in the field per assembly. In addition, the side panels limit the amount of concrete needed to sufficiently encase the conduits. Safety, efficiency, and economics are significantly improved.

The present disclosure describes a template for use in an underground duct bank including a longitudinal axis and a transverse axis; a central portion including a plurality of conduit apertures each configured to accommodate a conduit; and first and second outboard portions disposed adjacent the central portion and opposite each other along the transverse axis, each outboard portion including an elongate panel slot parallel to the longitudinal axis and a framework aperture configured to accommodate a framework piece, wherein each panel slot is transversely spaced from the conduit apertures, and wherein each panel slot is configured to accommodate a generally planar side panel.

The present disclosure also describes an underground duct bank assembly including a plurality of templates each including a longitudinal axis and a transverse axis, a central portion including a plurality of conduit apertures each configured to accommodate a conduit, and first and second outboard portions disposed adjacent the central portion and opposite each other along the transverse axis, each outboard portion including a framework aperture configured to accommodate a framework piece; a plurality of conduits each extending into a conduit aperture; and a framework configured to connect adjacent templates, the framework including a plurality of framework pieces and angle braces, wherein two adjacent angle braces meet at a framework aperture and are affixed to the template and each other without welding.

The present disclosure further describes an underground duct bank assembly including a plurality of templates each including a longitudinal axis and a transverse axis, a central portion including a plurality of conduit apertures each configured to accommodate a conduit, and first and second outboard portions disposed adjacent the central portion and opposite each other along the transverse axis, each outboard portion including a framework aperture configured to accommodate a framework piece; a plurality of conduits each extending into a conduit aperture; a framework configured to connect adjacent templates, the framework including a plurality of framework pieces and angle braces, wherein two adjacent angle braces meet at a framework aperture and are affixed to the template and each other using a mechanical fastener; and a plurality of intersections of two framework pieces affixed to each other using a mechanical fastener, wherein the underground duct bank assembly is constructed without welding.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

Figure 1:
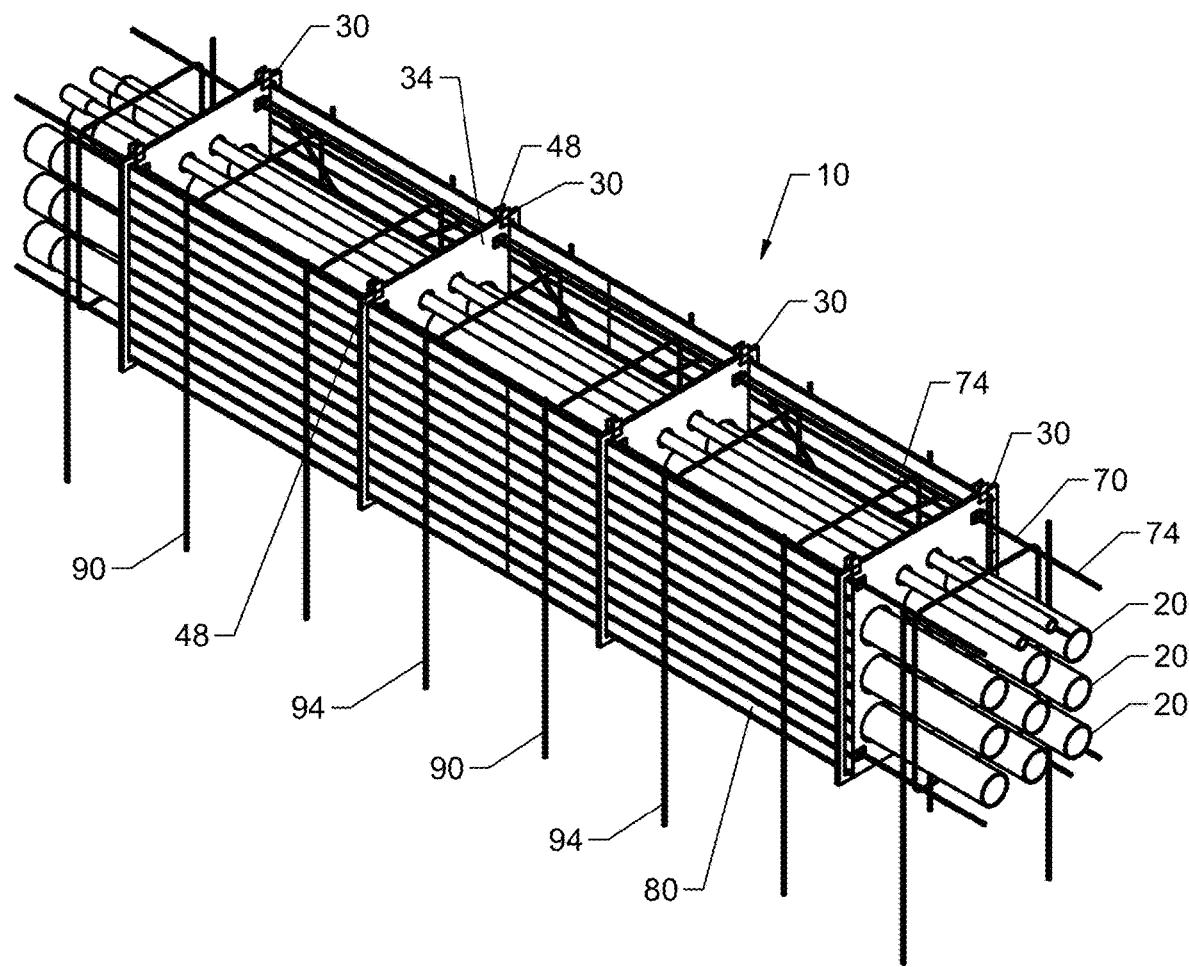
FIG. 1 representatively illustrates a perspective view of an underground duct bank assembly of the present disclosure.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

Reference now will be made in detail to various aspects of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one aspect, can be used on another aspect to yield a still further aspect. Thus, it is intended that the present disclosure covers such modifications and variations as come within the scope of the appended claims and their equivalents. Further, for reasons of clarity, repeated identical elements in the figures are not all identified with an element number. As a result, the presence or absence of an element number should not be taken as limiting the disclosure.

The present disclosure provides an easy-to-install duct bank assembly that can be manufactured under the controlled conditions of a factory and installed with minimal field work. A template design allows the duct bank assembly to be shipped and installed with the sides of the duct bank assembly in some aspects already enclosed, thus eliminating the need to install rebar, side panels, and hundreds of tie wire attachments in the field per assembly.

In addition, the side panels limit the amount of concrete needed to sufficiently encase the conduits. For a concrete backfill installation, concrete is typically poured to fill the trench in which the assembly is installed. The present disclosure allows the concrete pour to be limited to that which is necessary.

Further, in some prior art uses a duct bank assembly is precast with concrete and then shipped what could be a significant distance to the installation site, resulting in substantial shipping charges due to the weight of the concrete. The duct bank assembly of the present disclosure allows the installer to use locally-sourced concrete to avoid such shipping charges.

As illustrated in FIG. 1, an underground duct bank assembly 10 of the present disclosure includes a plurality of conduits or ducts 20, a plurality of templates 30, and a framework 70 holding the assembly 10 together. The assembly 10 also includes side panels 80 to limit the amount of backfill needed to sufficiently cover the conduits 20.

Each conduit or duct 20 can be of any suitable length, diameter, thickness, material, and combination thereof as needed for a particular run of cables, wires, or others. Any suitable number or arrangement of conduits or ducts 20 can be included in an assembly 10.

The underground duct bank assembly 10 of the present disclosure includes a plurality of templates 30. In the present disclosure each template 30 serves three primary purposes: to support and separate the conduits 20, to anchor the side panels 80, and to anchor the framework pieces 74. Each template 30 includes a central portion 34 having one or more conduit apertures 38 formed therethrough. Each template 30 is configured such that a section of conduit 20 passes through a conduit aperture 38. If that section of conduit 20 passes through two adjacent templates 30, that section of conduit 20 is supported by the conduit apertures 38 of the two adjacent templates 30. In this manner adjacent templates 30 can support as many sections of conduit 20 as each has conduit apertures 38.

Figure 2:
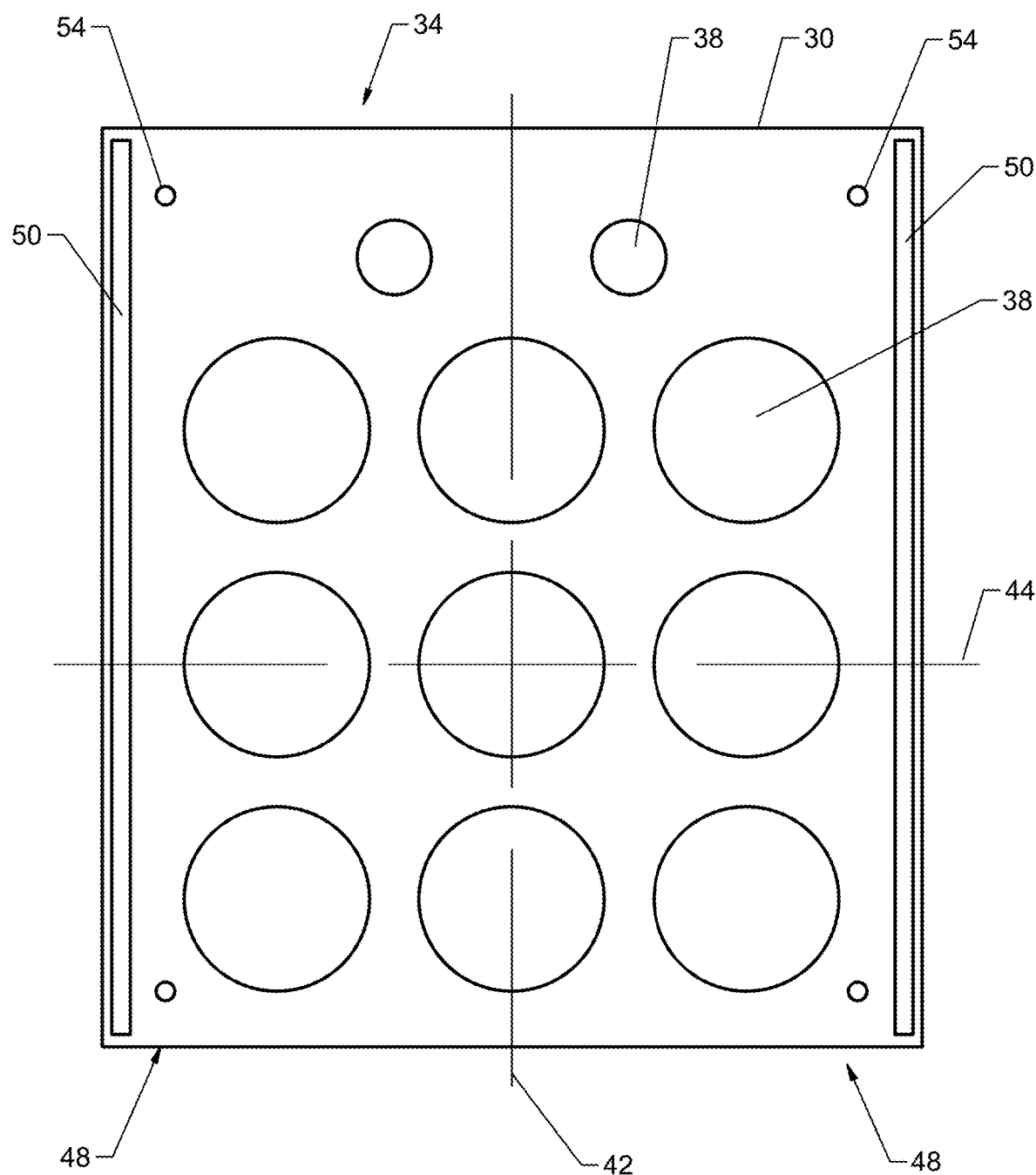
FIG. 2 representatively illustrates an elevation view of a template of the present disclosure used in the underground duct bank assembly of FIG. 1.

Each template 30 has a hypothetical longitudinal axis 42 and a hypothetical transverse axis 44 (see FIG. 2). The longitudinal and transverse axes 42, 44 meet in the central portion 34. The conduit apertures 38 formed in the central portion 34 number at least as needed to accommodate the number of conduits 20 expected to be included in the assembly 10. Each template 30 also includes at least one outboard portion 48 disposed transversely outward from and adjacent to the central portion 34 as illustrated in FIG. 2. In another aspect of the present disclosure, the template 30 can include two outboard portions 48 disposed on opposite sides of the central portion 34 in the transverse direction. Each outboard portion 48 includes an elongate panel slot 50 parallel to the longitudinal axis 42. The panel slot 50 is an aperture extending through the thickness of the template 30 such that the panel slot 50 is open in both directions. The panel slots 50 are positioned transversely outward from the conduit apertures 38 for reasons described below.

The template 30 also includes one or more framework apertures 54 disposed in the central and/or outboard portions 34, 48. As illustrated in FIG. 2 the framework apertures 54 are disposed between the conduit apertures 38 and the panel slots 50 but can be disposed in any suitable position. Each framework aperture 54 is sized and shaped to accommodate a framework piece 74 as described below.

The underground duct bank assembly 10 of the present disclosure also includes a framework 70 constructed from framework pieces 74. In one aspect various framework pieces 74 are made from rebar and wire, although any suitable materials can be used. The framework 70 is configured to connect and support adjacent templates 30. In various aspects of the present disclosure, the framework pieces 74 can include angle braces 76 for additional structural strength. Framework pieces 74 are connected to templates 30 where the framework pieces 74 pass through the framework apertures 54 of the templates 30. The templates 30 are held in place using square nuts 78 affixed to the framework pieces 74 adjacent the templates 30. The square nuts 78 can be affixed to the framework pieces 74 by welding, tie wires, or any other suitable technique. Intersections of two or more framework pieces 74 are typically affixed by welding for structural strength.

The framework 70 helps to maintain proper spacing and verticality of the templates 30, which consequently support the conduits 20. Framework pieces 74 are selected for length, thickness, material, and connection method in a known manner to provide structural support to the duct bank assembly 10. With sufficient structural strength, the entire duct bank assembly 10 can be lifted by crane or other lifting device. In one common aspect, steel rebar and steel wire are selected as framework pieces 74 to provide structural strength and to allow connection by welding and mechanical entwining.

The underground duct bank assembly 10 of the present disclosure also includes a plurality of side panels 80 each extending through and between panel slots 50 of adjacent templates 30. The side panels 80 provide a barrier between the conduits 20 and framework 70 and the environment in which the duct bank assembly 10 resides. The side panels 80 can help limit the spread of whatever fill material is used to encase the conduits 20. The side panels 80 can also limit mixing between the type of material used to encase the conduit 20 and framework 70 and the type of material used to backfill the area in which the duct bank assembly 10 sits. For example, one might choose to encase the conduit 20 and framework 70 in concrete for protection while desiring to limit the amount of concrete disposed in the trench. The side panels 80 will limit the concrete pour to the conduit 20/framework 70 area, allowing the remainder of the trench to be filled with much cheaper backfill without compromising the protection provided to the conduit 20. The side panel material, size, and thickness can be chosen based on the material to be filled within the duct bank assembly 10. For example, the side panels 80 can be 0.25 inch thickness high density polyethylene (HDPE), 6 mm or 10 mm thickness corrugated plastic, plywood, steel sheeting, or a commercial product such as STAY-FORM sheeting available from Amico in Birmingham, Alabama.

The underground duct bank assembly 10 of the present disclosure can also include one or more intermediate supports 90 between adjacent templates 30 if additional support is needed to prevent the side panels 80 from bowing outward under pressure from fill. Intermediate supports 90 can be rebar or other suitable material that is attached to the framework 70 or installed separately. Further, the framework 70 and/or a template 30 can include a ground anchor 94 to help anchor the duct bank assembly 10 in its location. With sufficient length the intermediate support 90 can also act as a ground anchor 94. In addition, the framework 70 can include one or more framework splicers (not shown) such as a length of rebar used to affix one duct bank assembly 10 to an adjacent duct bank assembly 10.

The number, size, and types of cables and wires to be carried by the duct bank assembly 10 are key inputs to a structural analysis to determine the number, size, and material to be used for conduits and ducts 20; the sizing, thickness, and spacing of templates 30 and intermediate supports 90; and the sizing, material, and connection methods used in the framework 70. The factors as well as the materials to be used for fill and backfill will determine the material, size, and thickness needed for the side panels 80.

Figure 3:
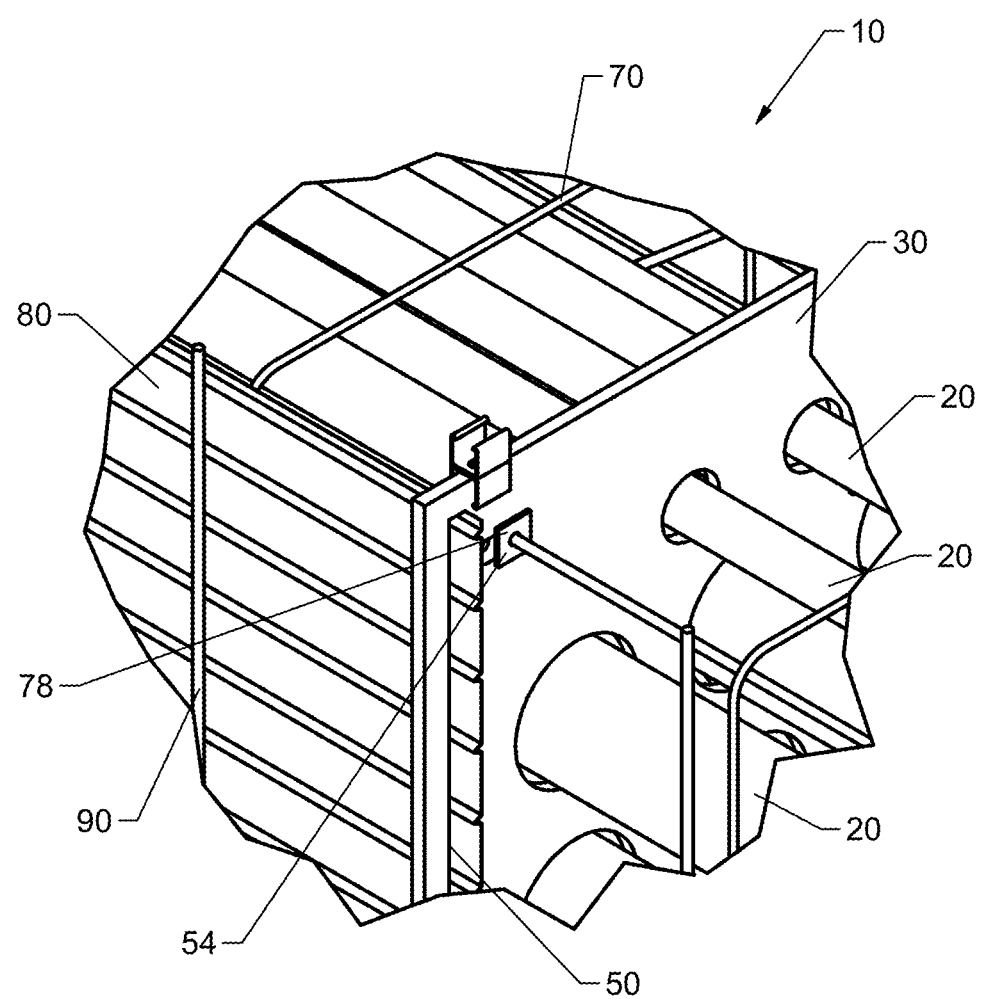
FIG. 3 representatively illustrates a perspective view of a portion of the underground duct bank assembly of FIG. 1.
Figure 4:
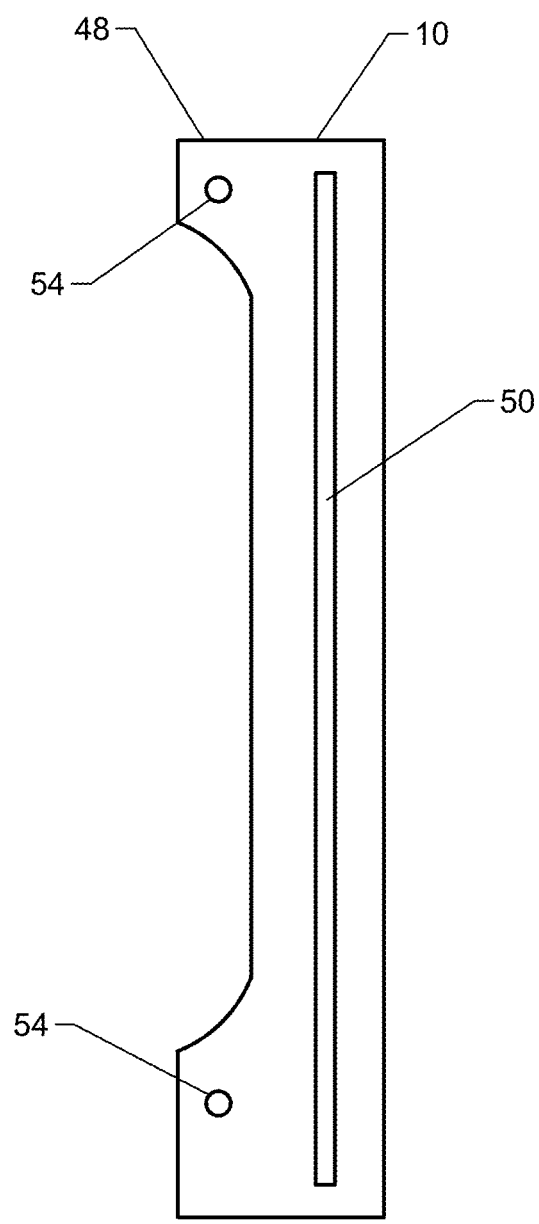
FIG. 4 representatively illustrates an elevation view of an outboard portion of an alternative aspect of the template of FIG. 2.
Figure 5:
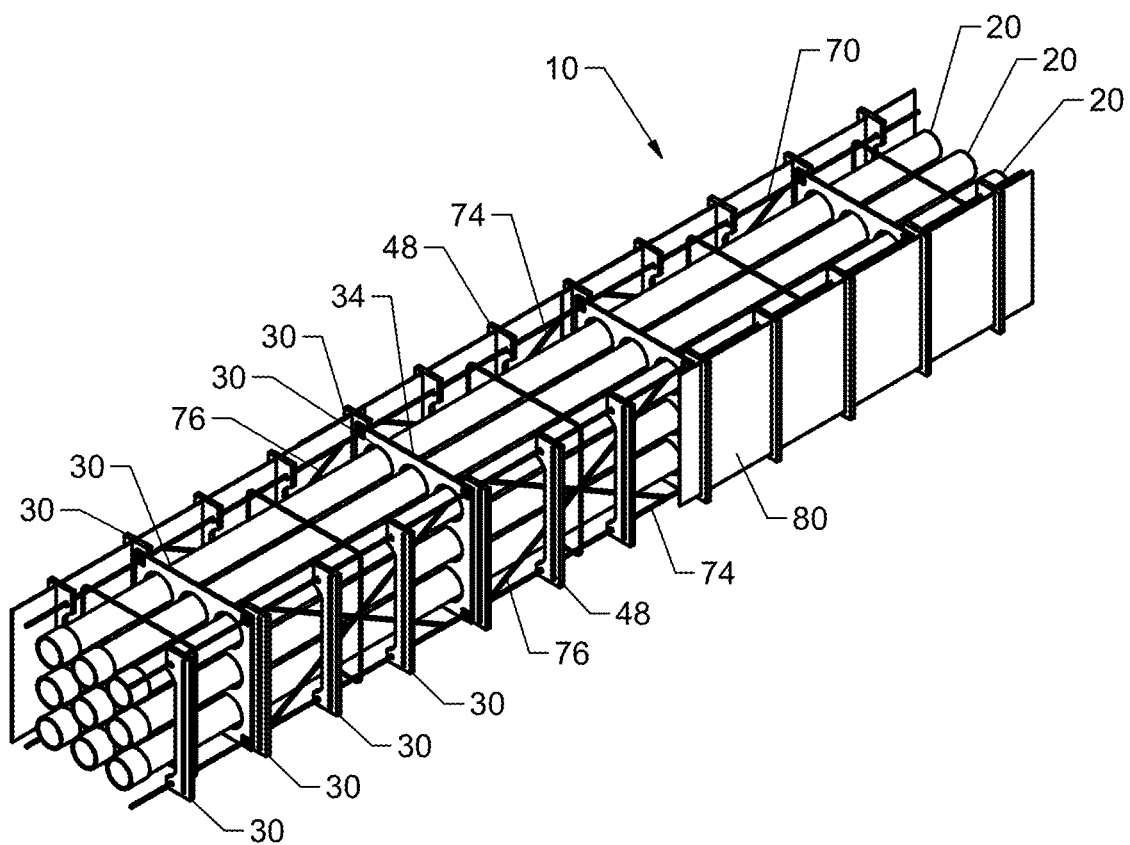
FIG. 5 representatively illustrates a perspective view of an alternative aspect of the underground duct bank assembly of FIG. 1.

In the aspects of the present disclosure illustrated in FIGS. 1-3, the template 30 is a unitary construction of the central and outboard portions 34, 48. In other aspects illustrated in FIGS. 4-5, the central and outboard portions 34, 48 of the template 30 are separate. The outboard portions 48 each include a panel slot 50 and at least one framework aperture 54, while the central portions 34 include a plurality of conduit apertures 38 and at least one framework aperture 54. Because the outboard portions 48 support side panels 80 and the central portions 34 support conduits 20, the number, sizing, thickness, material, and spacing of the outboard and central portions 34, 48 do not need to be the same and can be selected separately based on a structural analysis. In the aspect illustrated in FIG. 5, between each central portion 34 combined with two outboard portions 48 are four outboard portions 48 providing intermediate support. Each outboard and central portion 34, 48 is still affixed to the framework 70 in the manner described herein.

In one example of the underground duct bank assembly 10 of the present disclosure, a duct bank assembly 10 has a 3×3 matrix of 6-inch conduits 20. The spacing between templates 30 is 60 inches, the template 30 thickness is 0.5 inches, and the distance from the outer edge of the outboard portion 48 to the outer edge of the panel slot 50 is 1.375 inches. The panel slot 50 has a width of 0.5 inches. Modifications to this example can be made for additional strength if desired. For example, the template 30 thickness can be increased to 0.75 inches. The distance from the outer edge of the outboard portion 48 to the outer edge of the panel slot 50 can be increased to 2 inches. A rebar stake can be inserted into the ground adjacent the side panel 80 intermediate two templates 30 as an intermediate support 90. The spacing between adjacent templates 30 can be reduced to 50 inches or less. The weight of the fill material, specifically concrete, is the primary factor in determining the dimensions and materials needed.

Selection of appropriate materials and dimensions allows one to build a duct bank assembly 10 in a controlled environment such as a factory, ship it to a site as one piece, and place it in a trench ready for concrete with no additional bracing or forming needed, thereby significantly improving safety, efficiency, and economy.

Figure 6:
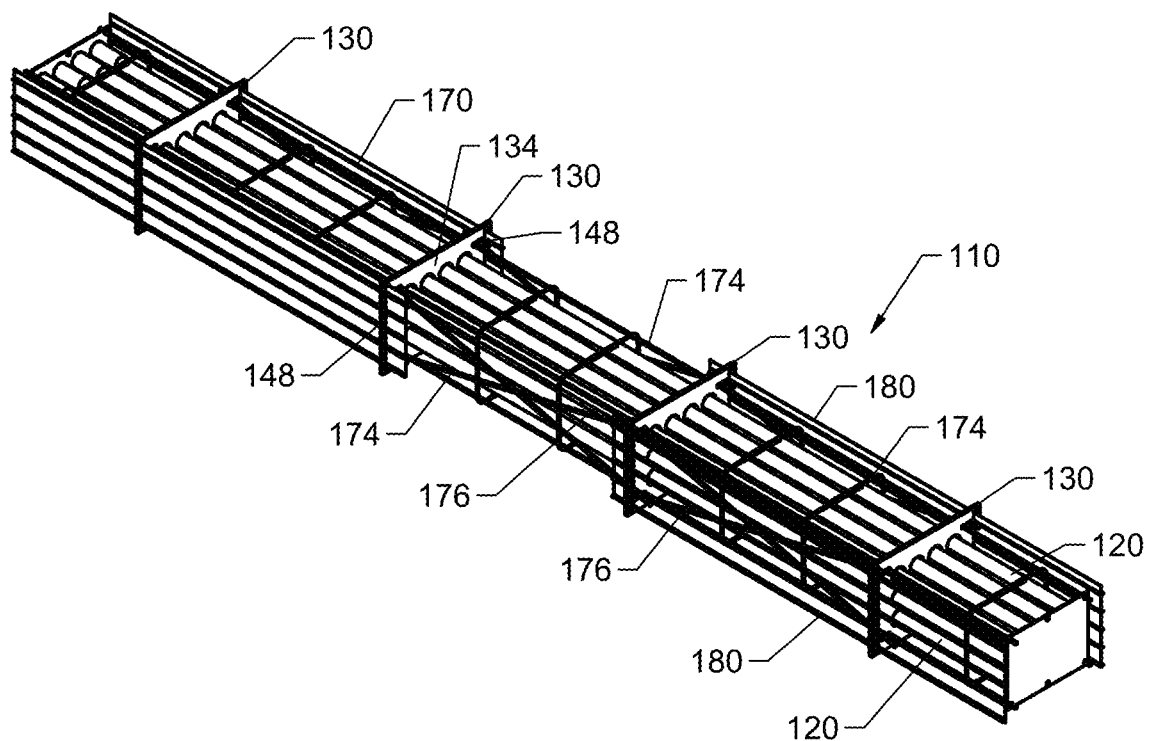
FIG. 6 representatively illustrates a perspective view of an alternative aspect of the underground duct bank assembly of FIG. 1.

In an alternative aspect illustrated in FIG. 6, an underground duct bank assembly 110 of the present disclosure includes a plurality of conduits or ducts 120, a plurality of templates 130, and a framework 170 holding the assembly 110 together. The assembly 110 also includes side panels 180 to limit the amount of backfill needed to sufficiently cover the conduits 120.

Each conduit or duct 120 can be of any suitable length, diameter, thickness, material, and combination thereof as needed for a particular run of cables, wires, or others. Any suitable number or arrangement of conduits or ducts 120 can be included in an assembly 110.

The underground duct bank assembly 110 of the present disclosure includes a plurality of templates 130. In the present disclosure each template 130 serves three primary purposes: to support and separate the conduits 120, to anchor the side panels 180, and to anchor the framework pieces 174. Each template 130 includes a central portion 134 having one or more conduit apertures 138 formed therethrough. Each template 130 is configured such that a section of conduit 120 passes through a conduit aperture 138. If that section of conduit 120 passes through two adjacent templates 130, that section of conduit 120 is supported by the conduit apertures 138 of the two adjacent templates 130. In this manner adjacent templates 130 can support as many sections of conduit 120 as each has conduit apertures 138.

Figure 7:
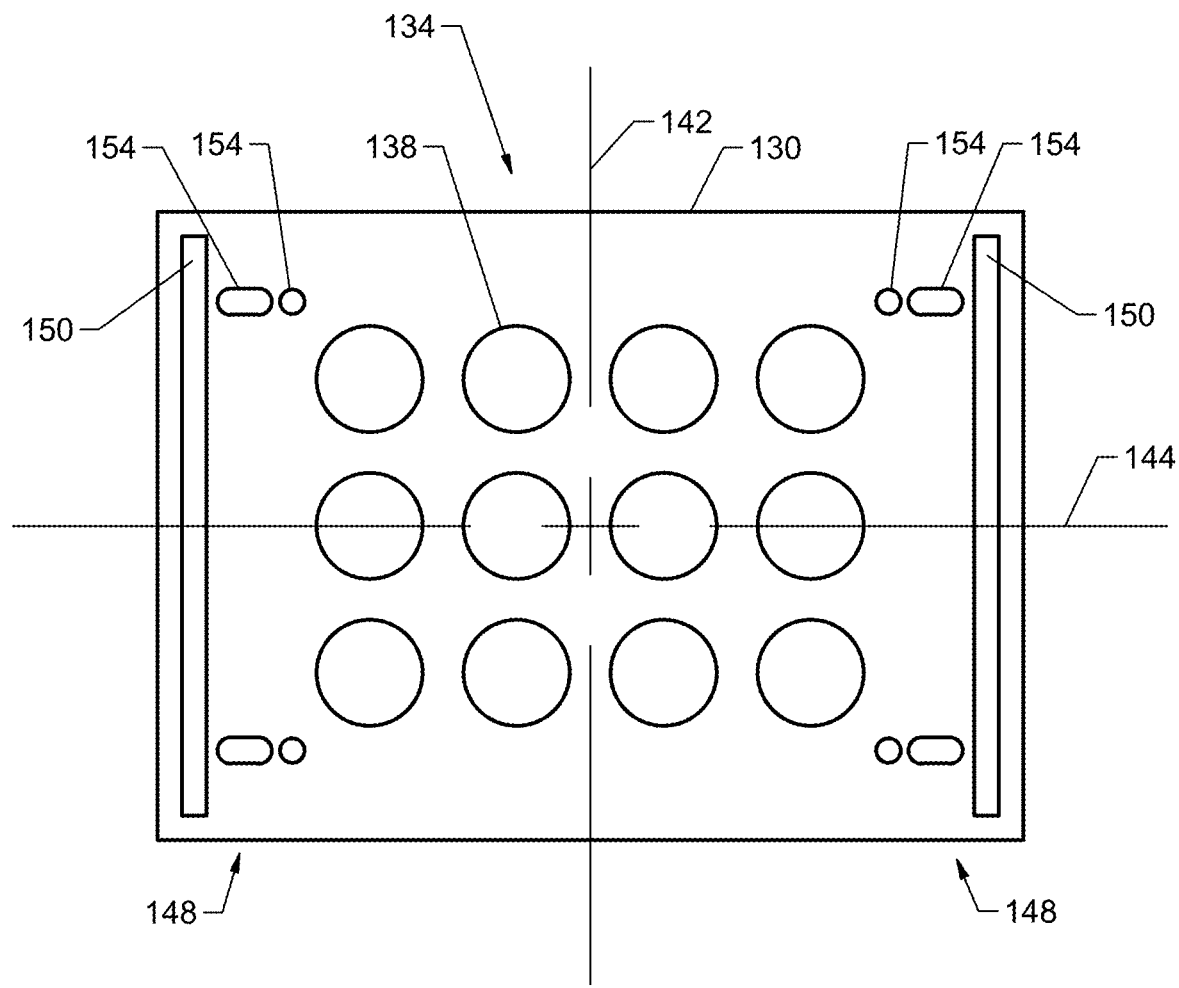
FIG. 7 representatively illustrates an elevation view of a template of the present disclosure used in the underground duct bank assembly of FIG. 6.

Each template 130 has a hypothetical longitudinal axis 142 and a hypothetical transverse axis 144 (see FIG. 7). The longitudinal and transverse axes 142, 144 meet in the central portion 134. The conduit apertures 138 formed in the central portion 134 number at least as needed to accommodate the number of conduits 120 expected to be included in the assembly 110. Each template 130 also includes at least one outboard portion 148 disposed transversely outward from and adjacent to the central portion 134 as illustrated in FIG. 7. In another aspect of the present disclosure, the template 130 can include two outboard portions 148 disposed on opposite sides of the central portion 134 in the transverse direction. Each outboard portion 148 includes an elongate panel slot 150 parallel to the longitudinal axis 142. The panel slot 150 is an aperture extending through the thickness of the template 130 such that the panel slot 150 is open in both directions. The panel slots 150 are positioned transversely outward from the conduit apertures 138 for reasons described below.

The template 130 also includes one or more framework apertures 154 disposed in the central and/or outboard portions 134, 148. As illustrated in FIG. 7, the framework apertures 154 are disposed between the conduit apertures 138 and the panel slots 150 but can be disposed in any suitable position. Each framework aperture 154 is sized and shaped to accommodate one or more framework pieces 174 as described below.

The underground duct bank assembly 110 of the present disclosure also includes a framework 170 constructed from framework pieces 174. In one aspect various framework pieces 174 are made from rebar and wire, although any suitable materials can be used. The framework 170 is configured to connect and support adjacent templates 130. In various aspects of the present disclosure, the framework pieces 174 can include angle braces 176 for additional structural strength. Framework pieces 174 are connected to templates 130 where the framework pieces 174 pass through the framework apertures 154 of the templates 130.

The framework 170 helps to maintain proper spacing and verticality of the templates 130, which consequently support the conduits 120. Framework pieces 174 are selected for length, thickness, material, and connection method in a known manner to provide structural support to the duct bank assembly 110. With sufficient structural strength, the entire duct bank assembly 110 can be lifted by crane or other lifting device. In one common aspect, steel rebar and steel wire are selected as framework pieces 174 to provide structural strength and to allow connection by mechanical entwining.

Figure 10:
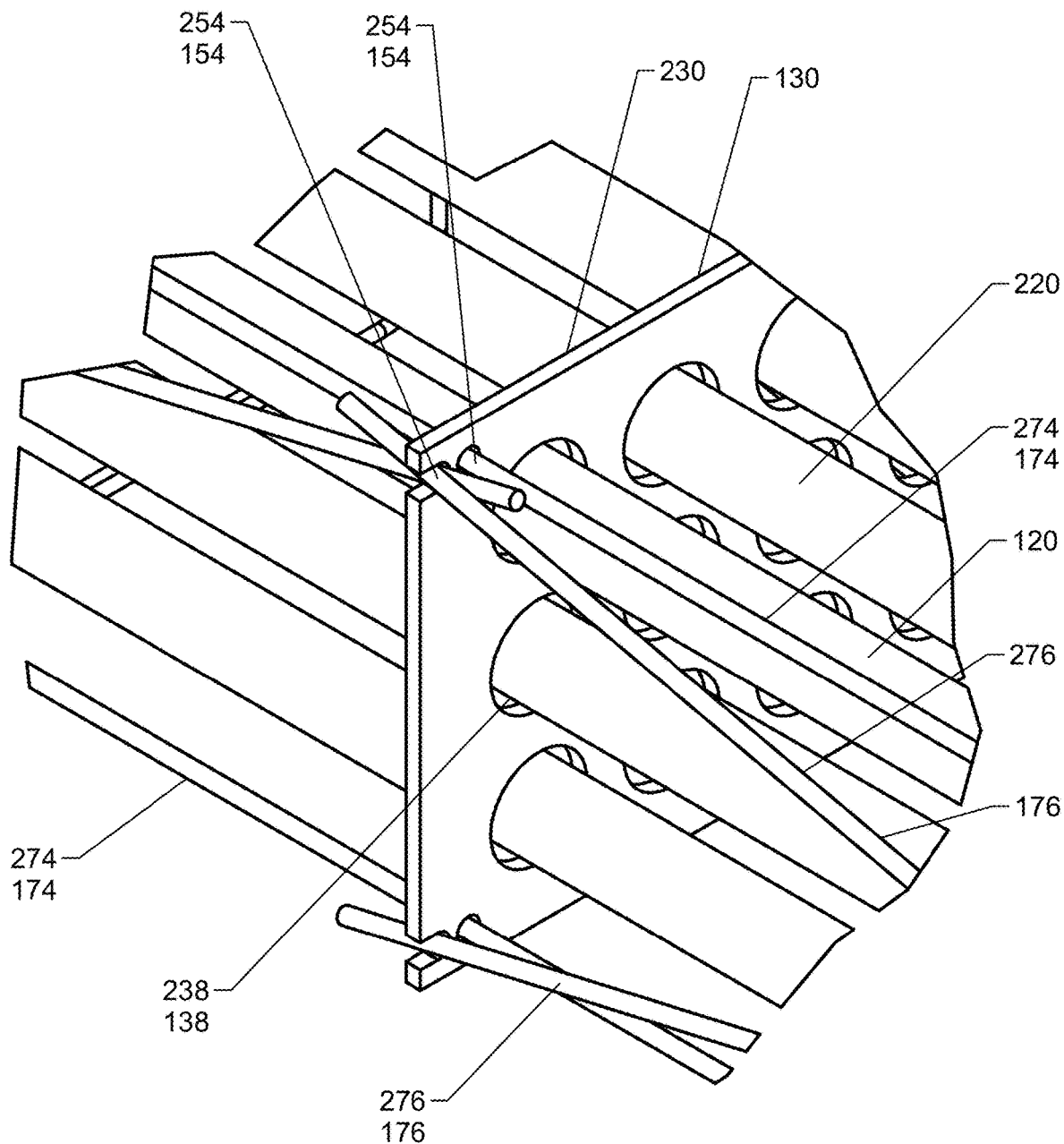
FIG. 10 representatively illustrates a perspective view of a portion of the underground duct bank assembly of FIG. 8.

As illustrated in FIG. 10, in this aspect the templates 130 are held in place where adjacent angle braces 176 cross at a framework aperture 154 and one or more additional framework pieces 174 pass through the same or an adjacent framework aperture 154. The angle braces 176, framework pieces 174, and template 130 are affixed using a mechanical fastener at that location. The mechanical fasteners in this disclosure can be tie wires, other wire, cable ties, pipe clamps, or any other suitable fastener that does not include affixing by welding. Returning to FIG. 6, intersections of two or more framework pieces 174 are affixed using mechanical fasteners for structural strength. In this manner, the entire duct bank assembly 110 can be constructed without welding, reducing the personnel time needed for the construction by as much as 80 percent in addition to the resulting increases in efficiency and safety and the inherent elimination of welding facility costs and risks.

The underground duct bank assembly 110 of the present disclosure also includes a plurality of side panels 180 each extending through and between panel slots 150 of adjacent templates 130. The side panels 180 provide a barrier between the conduits 120 and framework 170 and the environment in which the duct bank assembly 110 resides. The side panels 180 can help limit the spread of whatever fill material is used to encase the conduits 120. The side panels 180 can also limit mixing between the type of material used to encase the conduit 120 and framework 170 and the type of material used to backfill the area in which the duct bank assembly 110 sits. For example, one might choose to encase the conduit 120 and framework 170 in concrete for protection while desiring to limit the amount of concrete disposed in the trench. The side panels 180 will limit the concrete pour to the conduit 120/framework 170 area, allowing the remainder of the trench to be filled with much cheaper backfill without compromising the protection provided to the conduit 120. The side panel material, size, and thickness can be chosen based on the material to be filled within the duct bank assembly 110. For example, the side panels 180 can be 0.25 inch thickness high density polyethylene (HDPE), 6 mm or 10 mm thickness corrugated plastic, plywood, steel sheeting, or a commercial product such as STAY-FORM sheeting available from Amico in Birmingham, Alabama.

The underground duct bank assembly 110 of the present disclosure can also include one or more intermediate supports 190 between adjacent templates 130 if additional support is needed to prevent the side panels 180 from bowing outward under pressure from fill. Intermediate supports 190 can be rebar or other suitable material that is attached to the framework 170 or installed separately. Further, the framework 170 and/or a template 130 can include a ground anchor (not shown) to help anchor the duct bank assembly 110 in its location. With sufficient length the intermediate support 190 can also act as a ground anchor. In addition, the framework 170 can include one or more framework splicers (not shown) such as a length of rebar used to affix one duct bank assembly 110 to an adjacent duct bank assembly 110.

The number, size, and types of cables and wires to be carried by the duct bank assembly 110 are key inputs to a structural analysis to determine the number, size, and material to be used for conduits and ducts 120; the sizing, thickness, and spacing of templates 130 and intermediate supports 190; and the sizing, material, and connection methods used in the framework 170. The factors as well as the materials to be used for fill and backfill will determine the material, size, and thickness needed for the side panels 180.

Figure 8:
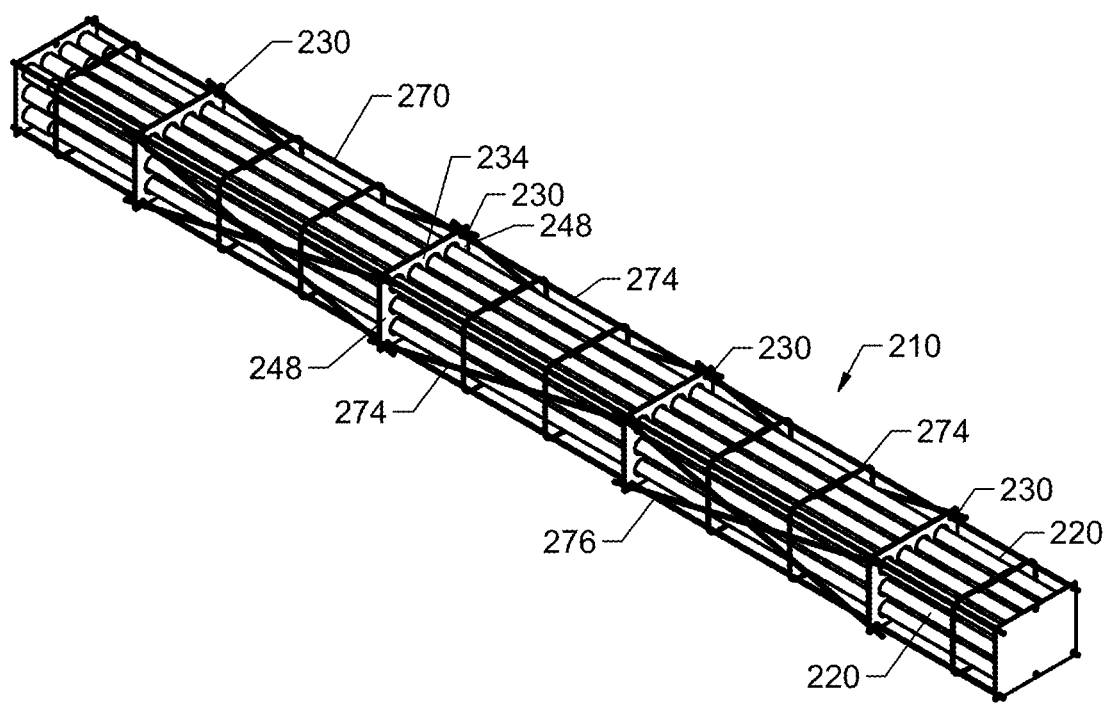
FIG. 8 representatively illustrates a perspective view of an alternative aspect of the underground duct bank assembly of FIG. 1.

In an alternative aspect illustrated in FIG. 8, an underground duct bank assembly 210 of the present disclosure includes a plurality of conduits or ducts 220, a plurality of templates 230, and a framework 270 holding the assembly 210 together.

Each conduit or duct 220 can be of any suitable length, diameter, thickness, material, and combination thereof as needed for a particular run of cables, wires, or others. Any suitable number or arrangement of conduits or ducts 220 can be included in an assembly 210.

The underground duct bank assembly 210 of the present disclosure includes a plurality of templates 230. In the present disclosure each template 230 serves two primary purposes: to support and separate the conduits 220, and to anchor the framework pieces 274. Each template 230 includes a central portion 234 having one or more conduit apertures 238 formed therethrough. Each template 230 is configured such that a section of conduit 220 passes through a conduit aperture 238. If that section of conduit 220 passes through two adjacent templates 230, that section of conduit 220 is supported by the conduit apertures 238 of the two adjacent templates 230. In this manner adjacent templates 230 can support as many sections of conduit 220 as each has conduit apertures 238.

Figure 9:
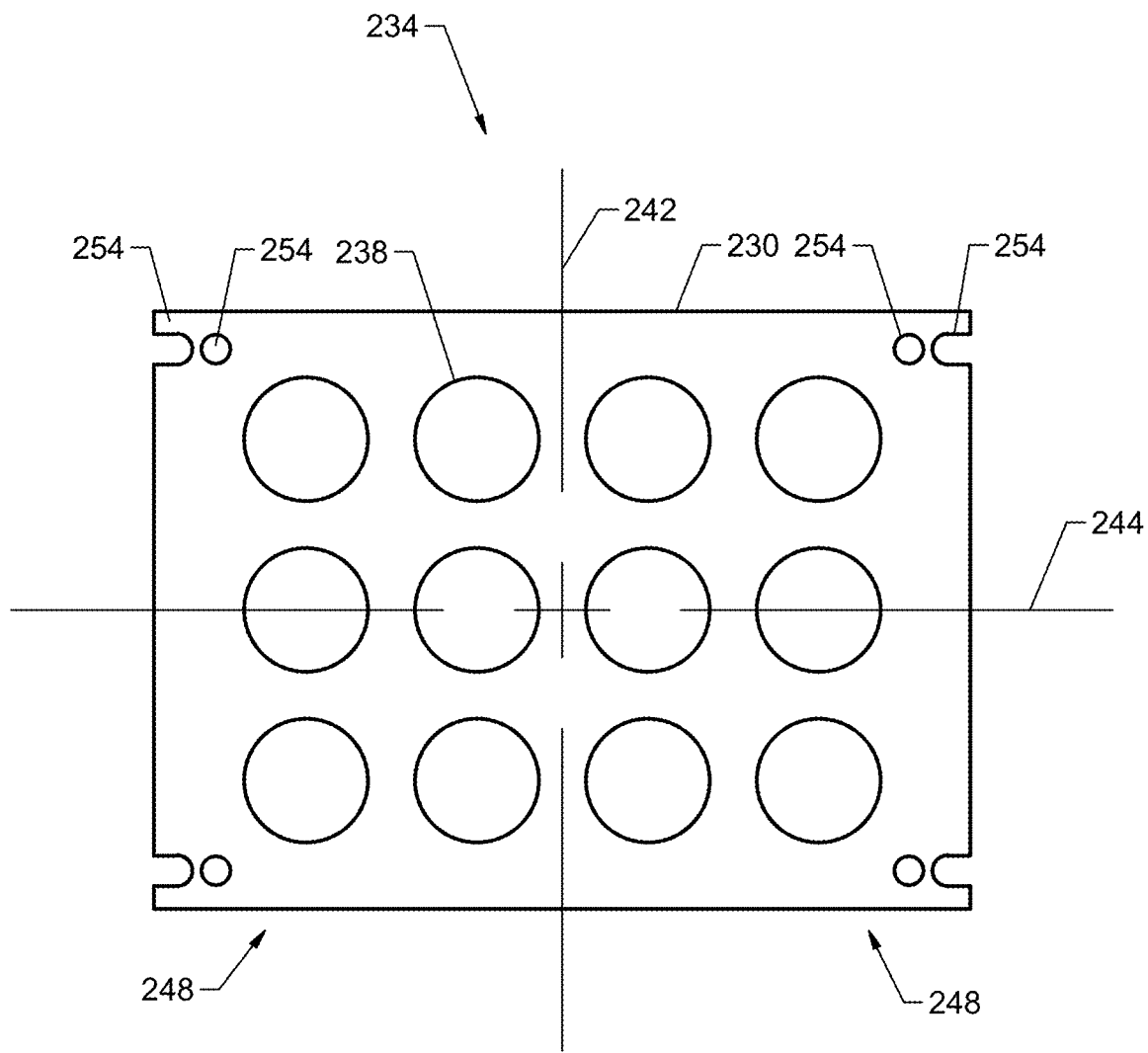
FIG. 9 representatively illustrates an elevation view of a template of the present disclosure used in the underground duct bank assembly of FIG. 8.

Each template 230 has a hypothetical longitudinal axis 242 and a hypothetical transverse axis 244 (see FIG. 9). The longitudinal and transverse axes 242, 244 meet in the central portion 234. The conduit apertures 238 formed in the central portion 234 number at least as needed to accommodate the number of conduits 220 expected to be included in the assembly 210. Each template 230 also includes at least one outboard portion 248 disposed transversely outward from and adjacent to the central portion 234 as illustrated in FIG. 9. In another aspect of the present disclosure, the template 230 can include two outboard portions 248 disposed on opposite sides of the central portion 234 in the transverse direction.

The template 230 also includes one or more framework apertures 254 disposed in the central and/or outboard portions 234, 248. As illustrated in FIG. 7, the framework apertures 254 are disposed outboard of the conduit apertures 238 but can be disposed in any suitable position. Each framework aperture 254 is sized and shaped to accommodate one or more framework pieces 274 as described below.

The underground duct bank assembly 210 of the present disclosure also includes a framework 270 constructed from framework pieces 274. In one aspect various framework pieces 274 are made from rebar and wire, although any suitable materials can be used. The framework 270 is configured to connect and support adjacent templates 230. In various aspects of the present disclosure, the framework pieces 274 can include angle braces 276 for additional structural strength. Framework pieces 274 are connected to templates 230 where the framework pieces 274 pass through the framework apertures 254 of the templates 230.

The framework 270 helps to maintain proper spacing and verticality of the templates 230, which consequently support the conduits 220. Framework pieces 274 are selected for length, thickness, material, and connection method in a known manner to provide structural support to the duct bank assembly 210. With sufficient structural strength, the entire duct bank assembly 210 can be lifted by crane or other lifting device. In one common aspect, steel rebar and steel wire are selected as framework pieces 274 to provide structural strength and to allow connection by mechanical entwining.

As illustrated in FIG. 10, in this aspect the templates 230 are held in place where adjacent angle braces 276 cross at a framework aperture 254 and one or more additional framework pieces 274 pass through the same or an adjacent framework aperture 254. The angle braces 276, framework pieces 274, and template 230 are affixed using mechanical fasteners at that location. Returning to FIG. 8, intersections of two or more framework pieces 274 are affixed using mechanical fasteners for structural strength. In this manner, the entire duct bank assembly 210 can be constructed without welding, reducing the personnel time needed for the construction by as much as 80 percent in addition to the resulting increases in efficiency and safety and the inherent elimination of welding facility costs and risks.

The underground duct bank assembly 210 of the present disclosure can also include one or more intermediate supports 290 between adjacent templates 230 if additional support is needed. Intermediate supports 290 can be rebar or other suitable material that is attached to the framework 270 or installed separately. Further, the framework 270 and/or a template 230 can include a ground anchor (not shown) to help anchor the duct bank assembly 210 in its location. With sufficient length the intermediate support 290 can also act as a ground anchor. In addition, the framework 270 can include one or more framework splicers (not shown) such as a length of rebar used to affix one duct bank assembly 210 to an adjacent duct bank assembly 210.

The number, size, and types of cables and wires to be carried by the duct bank assembly 210 are key inputs to a structural analysis to determine the number, size, and material to be used for conduits and ducts 220; the sizing, thickness, and spacing of templates 230 and intermediate supports 290; and the sizing, material, and connection methods used in the framework 270. The factors as well as the materials to be used for fill and backfill will determine the material, size, and thickness needed for the side panels 280.

While the disclosure has been described in detail with respect to specific aspects thereof, it will be appreciated that those skilled in the art, upon attaining understanding of the foregoing will readily appreciate alterations to, variations of, and equivalents to these aspects. Accordingly, the scope of the present disclosure should be assessed as that of the appended claims and any equivalents thereto. Additionally, all combinations and/or sub-combinations of the disclosed aspects, ranges, examples, and alternatives are also contemplated.

What is claimed:

1. An underground duct bank assembly comprising:
a plurality of templates each including a longitudinal axis and a transverse axis, a central portion including a plurality of conduit apertures each configured to accommodate a conduit, and first and second outboard portions disposed adjacent the central portion and opposite each other along the transverse axis, each outboard portion including:
an elongate panel slot parallel to the longitudinal axis, and
a framework aperture, the framework aperture configured to accommodate a framework piece,
wherein each panel slot is transversely spaced from the conduit apertures, and wherein each panel slot is configured to accommodate a generally planar side panel;
a plurality of conduits each extending into a conduit aperture; and
a framework configured to connect adjacent templates, the framework including a plurality of framework pieces and angle braces, wherein two adjacent angle braces meet at a framework aperture and are affixed to the template and each other without welding.

2. The underground duct bank assembly of claim 1, wherein the two adjacent angle braces are affixed to the template and each other with a mechanical fastener.

3. The underground duct bank assembly of claim 2, wherein the mechanical fastener is tie wire.

4. The underground duct bank assembly of claim 1, further comprising a framework piece intersecting the template adjacent the two adjacent angle braces and affixed to the template and the two adjacent angle braces using a mechanical fastener.

5. The underground duct bank assembly of claim 4, wherein the mechanical fastener is tie wire.

6. The underground duct bank assembly of claim 1, further comprising an intersection of two framework pieces affixed to each other using a mechanical fastener.

7. The underground duct bank assembly of claim 6, wherein the mechanical fastener is tie wire.

8. The underground duct bank assembly of claim 1, further comprising a plurality of side panels each extending between panel slots of adjacent templates.

9. The underground duct bank assembly of claim 1, wherein the central portion and the first and second outboard portions are a unitary structure.

10. The underground duct bank assembly of claim 1, wherein the central portion and at least one of the first and second outboard portions are separate pieces.

11. An underground duct bank assembly comprising:
a plurality of templates each including a longitudinal axis and a transverse axis, a central portion including a plurality of conduit apertures each configured to accommodate a conduit, and first and second outboard portions disposed adjacent the central portion and opposite each other along the transverse axis, each outboard portion including a framework aperture configured to accommodate a framework piece, each outboard portion also including an elongate panel slot parallel to the longitudinal axis, wherein each panel slot is transversely spaced from the conduit apertures, and wherein each panel slot is configured to accommodate a generally planar side panel;
a plurality of side panels each extending between panel slots of adjacent templates;
a plurality of conduits each extending into a conduit aperture;
a framework configured to connect adjacent templates, the framework including a plurality of framework pieces and angle braces, wherein two adjacent angle braces meet at a framework aperture and are affixed to the template and each other using a mechanical fastener; and
a plurality of intersections of two framework pieces affixed to each other using a mechanical fastener, wherein the underground duct bank assembly is constructed without welding.

12. The underground duct bank assembly of claim 11, wherein the mechanical fasteners are tie wire.

13. The underground duct bank assembly of claim 11, further comprising a framework piece intersecting the template adjacent the two adjacent angle braces and affixed to the template and the two adjacent angle braces using a mechanical fastener.

14. The underground duct bank assembly of claim 13, wherein the mechanical fastener is tie wire.

15. The underground duct bank assembly of claim 11, wherein the central portion and the first and second outboard portions are a unitary structure.

16. The underground duct bank assembly of claim 11, wherein the central portion and at least one of the first and second outboard portions are separate pieces.

17. An underground duct bank assembly comprising:
- a plurality of templates each including a longitudinal axis and a transverse axis, a central portion including a plurality of conduit apertures each configured to accommodate a conduit, and first and second outboard portions disposed adjacent the central portion and opposite each other along the transverse axis, each outboard portion including a framework aperture configured to accommodate a framework piece, each outboard portion also including an elongate panel slot parallel to the longitudinal axis, wherein each panel slot is transversely spaced from the conduit apertures, wherein each panel slot is configured to accommodate a generally planar side panel, and wherein the central portion and the first and second outboard portions of each template are a unitary structure;
- a plurality of side panels each extending between panel slots of adjacent templates;
- a plurality of conduits each extending into a conduit aperture;
- a framework configured to connect adjacent templates, the framework including a plurality of framework pieces and angle braces, wherein two adjacent angle braces meet at a framework aperture and are affixed to the template and each other using a mechanical fastener; and
- a plurality of intersections of two framework pieces affixed to each other using a mechanical fastener, wherein the underground duct bank assembly is constructed without welding.

18. The underground duct bank assembly of claim 17, further comprising an additional outboard portion positioned between two adjacent templates, the additional outboard portion including an elongate panel slot configured to accommodate a generally planar side panel.

19. The underground duct bank assembly of claim 17, further comprising a plurality of additional outboard portions positioned between two adjacent templates, each additional outboard portion including an elongate panel slot configured to accommodate a generally planar side panel.

* * * * *